United States Patent
Levy et al.

(10) Patent No.: US 12,202,749 B1
(45) Date of Patent: Jan. 21, 2025

(54) DEVICE FOR SCALE PREVENTION IN WATER SYSTEMS INCORPORATING MAGNETIC FIELD EXPOSURE AND METHOD

(71) Applicant: ERD Paris, LLC, Santa Rosa Beach, FL (US)

(72) Inventors: Ehud Levy, Santa Rosa Beach, FL (US); Danny F. Lincoln, Commerce, GA (US)

(73) Assignee: ERD Paris, LLC, Middletown, DE (US)

( * ) Notice: Subject to any disclaimer, the term of this patent is extended or adjusted under 35 U.S.C. 154(b) by 0 days.

(21) Appl. No.: 18/759,868

(22) Filed: Jun. 29, 2024

(51) Int. Cl.
  *C02F 1/48* (2023.01)
  *C02F 101/20* (2006.01)
  *C02F 103/02* (2006.01)

(52) U.S. Cl.
  CPC ............ *C02F 1/488* (2013.01); *C02F 1/481* (2013.01); *C02F 2101/20* (2013.01); *C02F 2103/02* (2013.01); *C02F 2201/005* (2013.01); *C02F 2201/48* (2013.01); *C02F 2303/22* (2013.01); *C02F 2305/00* (2013.01); *C02F 2307/12* (2013.01)

(58) Field of Classification Search
  None
  See application file for complete search history.

(56) References Cited

U.S. PATENT DOCUMENTS

| | | | | |
|---|---|---|---|---|
| 4,065,386 A | * | 12/1977 | Rigby | A61L 2/08 210/695 |
| 4,366,053 A | | 12/1982 | Lindler | |
| 4,485,012 A | * | 11/1984 | Ehresmann | C02F 1/34 204/664 |
| 5,030,344 A | * | 7/1991 | Ambrose | C02F 1/482 210/222 |
| 5,783,074 A | | 7/1998 | Stanley | |

(Continued)

FOREIGN PATENT DOCUMENTS

| | | |
|---|---|---|
| CN | 2327678 Y | 7/1999 |
| CN | 203513343 U | 4/2014 |

OTHER PUBLICATIONS

Karkush, et al., "Magnetic Field influences on the Properties of Water Treated by Reverse Osmosis", Engineering, Technology & Applied Science Research, vol. 9, No. 4, pp. 4433-4439, Aug. 2019, Patras, Greece.

*Primary Examiner* — Bradley R Spies
*Assistant Examiner* — Jeannie McDermott
(74) *Attorney, Agent, or Firm* — Mitch Harris, Atty at Law, LLC; Andrew M. Harris

(57) ABSTRACT

A water processing system provides prevention of scale formation in both interrupted and recirculating flow operations. The system includes an inlet for receiving an inlet water flow, a magnetizing chamber, and an outlet for providing an outlet water flow. The magnetizing chamber is included in a device that has at least one permanent rod/bar magnet at least partially disposed within the water flow. The magnet has an axis extending between the poles thereof in a direction perpendicular to the flow, so that the magnetizing chamber exerts a magnetic force on scale suspended within the inlet water flow, and so that the suspended scale remains in suspension in the outlet water flow.

16 Claims, 11 Drawing Sheets

(56) References Cited

U.S. PATENT DOCUMENTS

| | | | | |
|---|---|---|---|---|
| 5,804,067 | A * | 9/1998 | McDonald | B01J 19/087 |
| | | | | 210/252 |
| 6,823,878 | B1 * | 11/2004 | Gadini | C02F 1/485 |
| | | | | 68/13 A |
| 9,475,062 | B2 | 10/2016 | Sazawa | |
| 9,663,691 | B2 | 5/2017 | Adams | |
| 10,351,449 | B2 | 7/2019 | Adams | |
| 10,815,135 | B2 | 10/2020 | Adams | |
| 2006/0131223 | A1 | 6/2006 | Hou et al. | |
| 2007/0262028 | A1 * | 11/2007 | Flaherty | B03C 1/286 |
| | | | | 210/695 |
| 2014/0109621 | A1 * | 4/2014 | Min | D06F 33/34 |
| | | | | 68/12.22 |
| 2014/0144533 | A1 * | 5/2014 | Min | D06F 39/086 |
| | | | | 137/798 |
| 2014/0144826 | A1 | 5/2014 | Mason | |
| 2016/0194229 | A1 * | 7/2016 | Mehdi | C02F 5/086 |
| | | | | 210/669 |
| 2022/0073384 | A1 | 3/2022 | Byun | |

* cited by examiner

DEVICE FOR SCALE PREVENTION IN WATER SYSTEMS INCORPORATING MAGNETIC FIELD EXPOSURE AND METHOD

BACKGROUND

1. Field of Disclosure

The field of representative embodiments of this disclosure relates generally to water scale prevention and filtration/water softener systems, and in particular, to a device, method and water treatment system that reduce or prevent scale deposition by exposing a water flow to a magnetic field.

2. Description of the Related Art

Lime scale and other types of scale are not typically completely prevented with ordinary water filtration or water softening systems, as the elements that lead to formation of scale may be in solution in the water. While reverse osmosis (RO) and ultra-filtration systems may be used to reduce or eliminate the concentration of ions that lead to scale, such systems are typically expensive to maintain and may be limited in capacity/throughput. In particular, in systems such as ice makers, in which water flow is not continuous, scale may readily form in tubing/pipes while the water has not been flowing, e.g., when the ice maker's output bin is full. In other systems such as dishwashers, scale pre-products are recirculated in a small volume of water, and the detergents and other additives that are used may contribute to scale formation.

Systems have been proposed and implemented that use magnets to treat water and prevent scale formation, but the effectiveness of such scale preventers has been questioned. Typically, a cylindrical magnet is placed around a pipe, thereby exposing the water flow to a solenoidal magnetic field.

Therefore, it would be desirable to provide a water scale preventer that provides effective prevention of scale formation.

SUMMARY

The above objectives, among others, are achieved in a water scale prevention device and system, and their methods of operation.

The water processing system includes an inlet for receiving an inlet water flow, a magnetizing chamber, and an outlet for providing an outlet water flow. The magnetizing chamber is included in the device, which has at least one permanent rod/bar magnet at least partially disposed within the water flow. The magnet has an axis extending between the poles thereof in a direction perpendicular to the flow, so that the magnetizing chamber exerts a magnetic force on scale suspended within the inlet water flow, and so that the suspended scale remains in suspension in the outlet water flow.

The summary above is provided for brief explanation and does not restrict the scope of the Claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DESCRIPTION OF ILLUSTRATIVE EMBODIMENT

The present disclosure illustrates water scale prevention systems and devices that reduce the deposition of scale in water/ice delivery and water recirculating systems. The water scale prevention devices, and the systems that contain them, reduce the deposit of limescale and/or compounds such as phosphates formed by the action of polyphosphate filtration commonly used with ice machines, as well as potentially reducing other scale components by exposing the water flow, or interrupted volume of a water flow, to a strong magnetic field. The intensity of the magnetic field applied to the water is enhanced by including one or more permanent magnets within, rather than around, the water flow path, and providing that the permanent magnet, which is a rod/bar magnet, has an axis extending between the magnet's magnetic poles in a direction perpendicular to the flow of the water. The intensity of the field may be further enhanced by the use of two (or more) bar/rod magnets, with the same poles of each of the magnets forced into proximity or contact within the water flow.

Figure 1A:
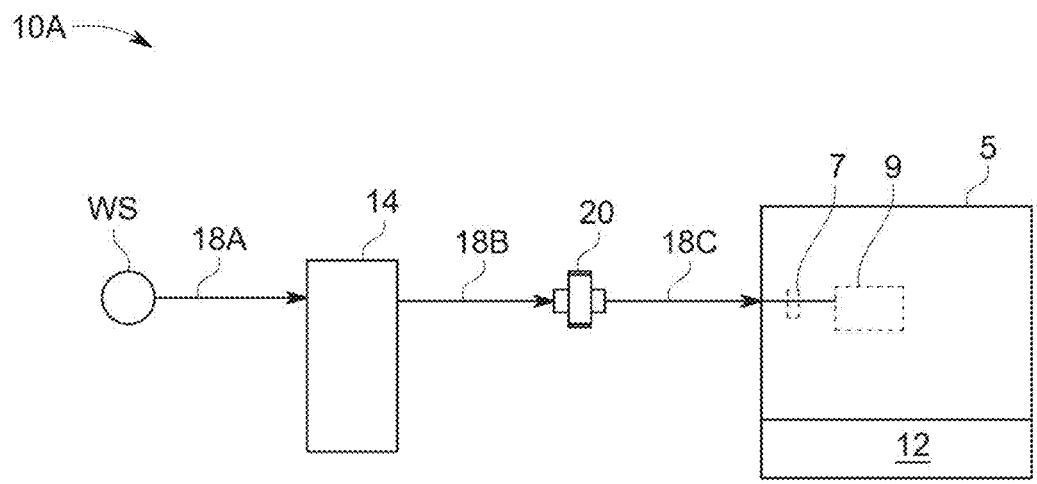
FIG. 1A is a block diagram of an example water scale prevention system 10A, in accordance with an embodiment of the disclosure.

Referring now to FIG. 1A, a block diagram of an example water scale prevention system 10A is shown, in accordance with an embodiment of the disclosure. Water scale prevention system 10A is implemented in the water input path of an ice machine 5, which receives input water flow from a water source WS, e.g., from a municipal water system, which is coupled through piping/tubing 18A to a water filtration or water softening subsystem 14 that includes one or more filters, one of which may be a filter with a polyphosphate water treatment core. The output flow of water filtration or water softening subsystem 14 is provided to a water scale prevention device 20, in accordance with an embodiment of the disclosure. Water scale prevention device 20 exposes water flow conducted through water scale prevention device 20 and also static volumes of water within water scale prevention device 20 to a strong magnetic field. The result of the magnetic field exposure leads to a dramatic decrease in water scale deposits in output piping/tubing 18C that couples water scale prevention device 20 to ice maker 5, and also may reduce scale deposits within ice maker 5. Ice machine 5, and water scale prevention system 10A, provides an example of an interrupted flow implementation of a water scale prevention system. Since ice machine 5 only operates an input valve water scale prevention system 10 only operates an input water control valve 7 to supply water flow to an ice maker 9 within ice machine 5 when an ice output bin 12 is not full, the flow of water through piping/tubing 18A, 18B and 18C is intermittent, and suspended scale within water contained in piping/tubing 18C, as well as in the internal components of ice machine 5 will deposit on interior surfaces of piping/tubing 18C and the internal components of ice machine 5. The magnetic field exposure provided by water scale prevention device 20 changes the nature of the suspended scale and/or the deposition process of scale formation, so that deposits of limescale and or phosphates/phosphor compounds and other post-ionic precipitates is reduced or eliminated within piping/tubing 18C and may be prevented the internal components of ice machine 5. The effect provided by water scale prevention device 20 is generally only limited by the length of piping/tubing 18C, and not the time that the flow is interrupted, so the effect of the scale reduction is dependent to some degree, on the length of the path through piping/tubing 18C and the internal components of ice machine 5.

Figure 1B:
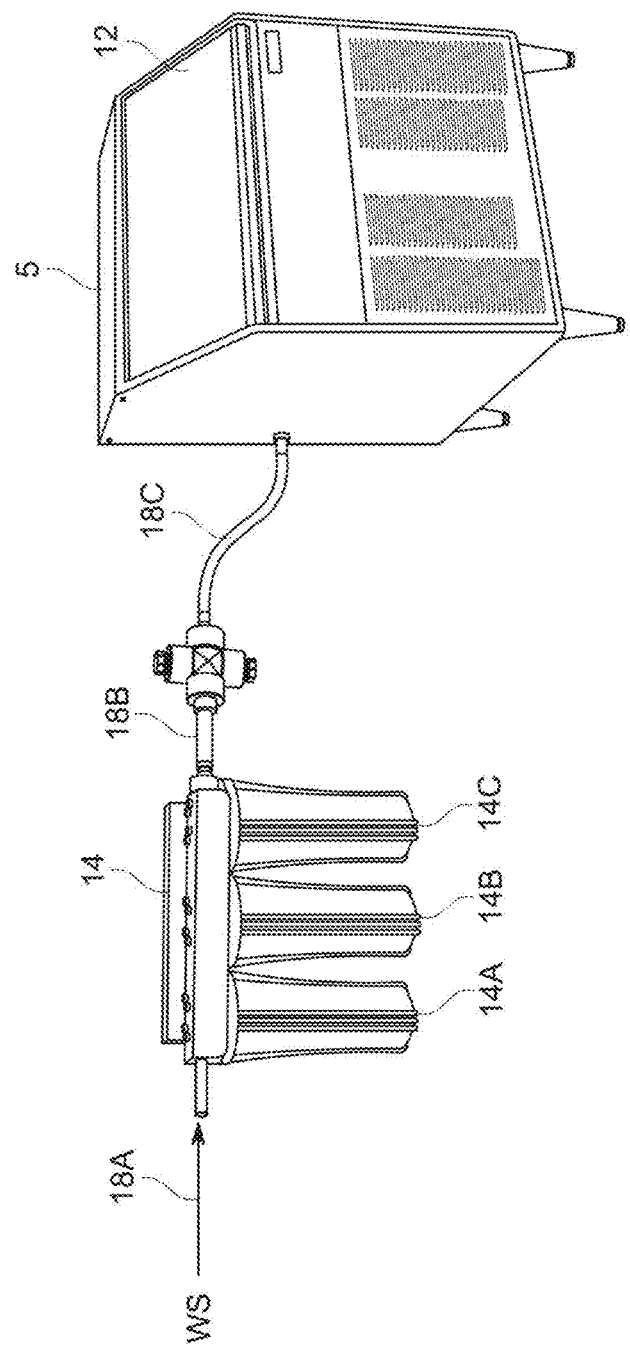
FIG. 1B is a pictorial view of example water scale prevention system 10A of FIG. 1A, in accordance with an embodiment of the disclosure.

Referring now to FIG. 1B, a pictorial view of example water scale prevention system 10A of FIG. 1A is shown, in accordance with an embodiment of the disclosure. Piping/tubing 18A receives input water from water supply WS, which is introduced to filtration or water softening subsystem 14. Filtration or water softening subsystem 14 is illustrated as a cascade of three filters 14A, 14B and 14C, which may be a mesh sediment filter 14A, followed by a filter 14B that provides polyphosphate (PHO) treatment and filtration, and a carbon block filter 14C to remove chlorine and other organic/odor-producing impurities. Alternatively, filtration or water softening subsystem 14 may include any filtration or water softening system, or a combination of both. Piping/tubing 18B conducts the output of filtration or water softening subsystem 14 to water scale prevention device 20, which exposes the water flow to a high-intensity magnetic field, and piping tubing 18C conducts the output of water scale prevention device 20 to ice machine 5, which produces ice available from ice output bin 12.

Figure 2:
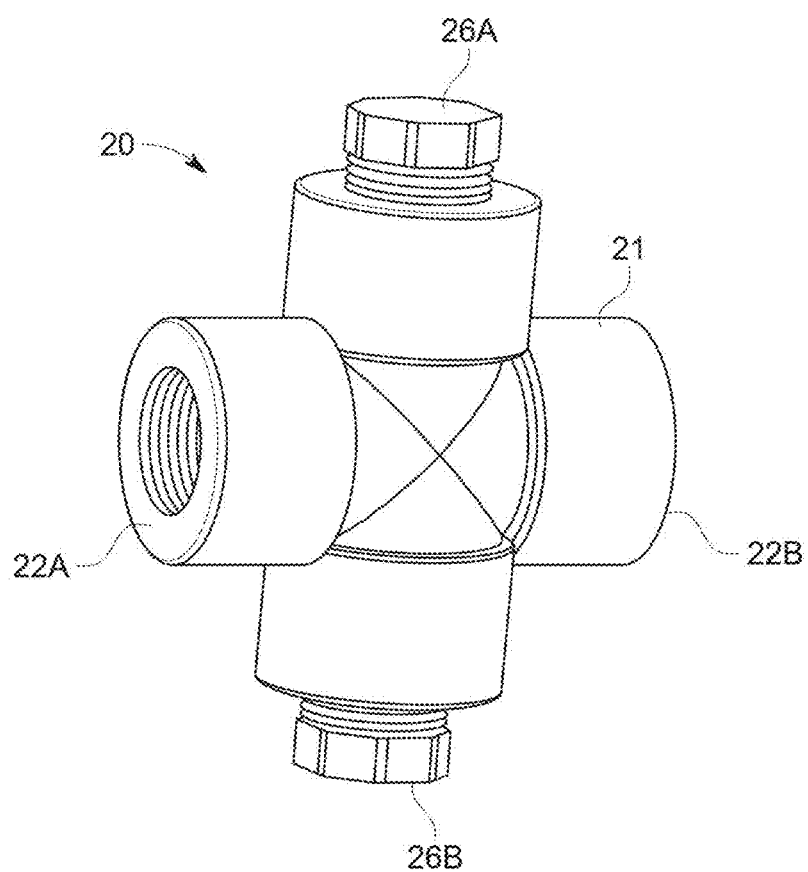
FIG. 2 is a front left perspective view of an example water scale prevention device 20 as may be used in example water scale prevention system 10A of FIG. 1A and FIG. 1B, as well as in example water scale prevention system 10B of FIGS. 4A and 4B, in accordance with an embodiment of the disclosure.
Figure 4A:
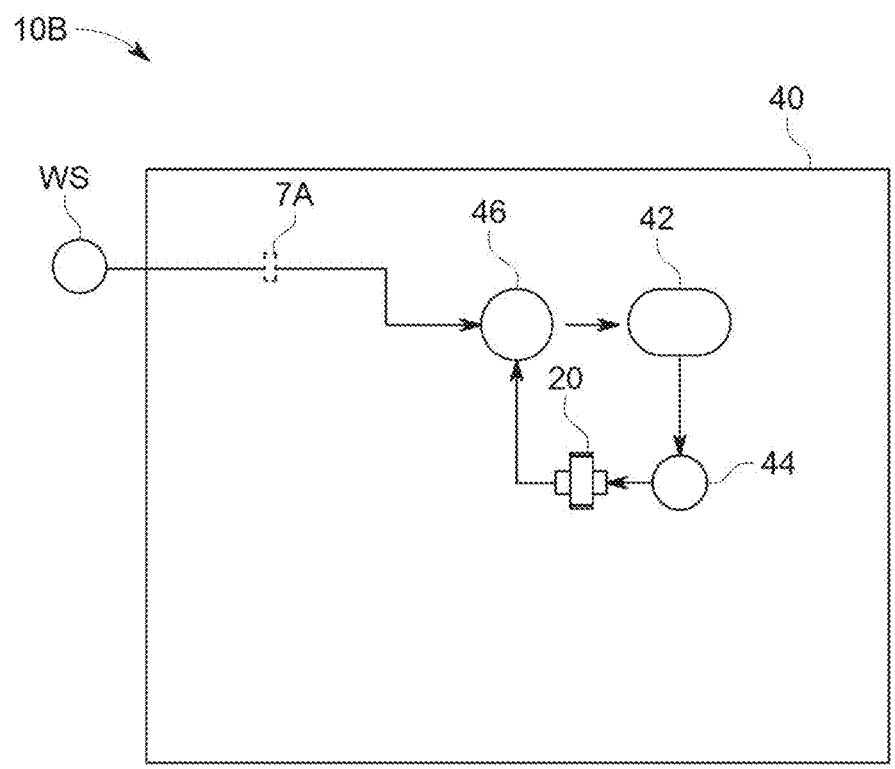
FIG. 4A is a block diagram of another example water scale prevention system 10B, in accordance with an embodiment of the disclosure.
Figure 4B:
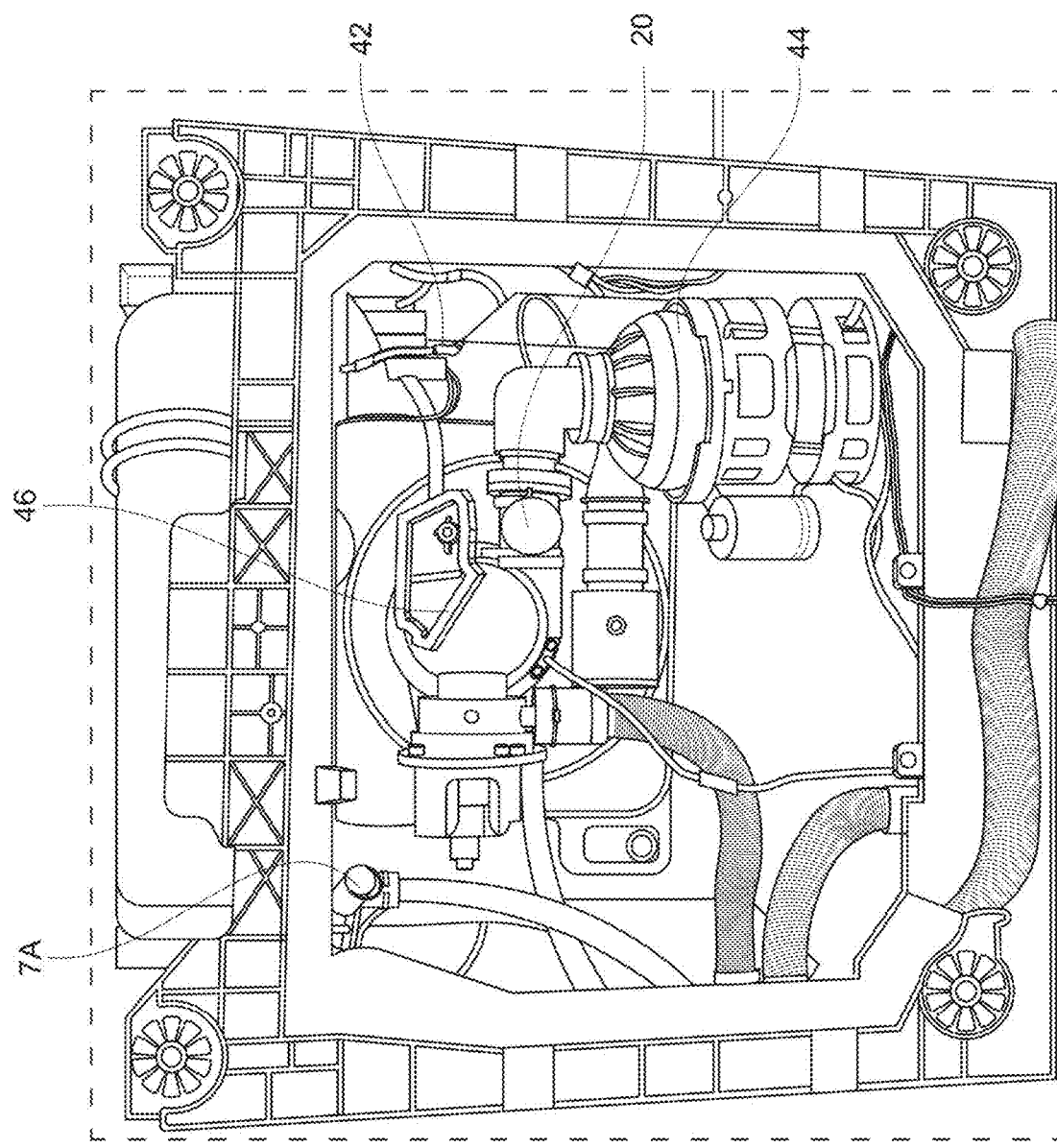
FIG. 4B is a pictorial view of example water scale prevention system 10B, in accordance with an embodiment of the disclosure.

Referring now to FIG. 2, a front left perspective view of an example water scale prevention device 20 as may be used in example water scale prevention system 10A of FIG. 1A and FIG. 1B, as well as in example water scale prevention system 10B of FIGS. 4A and 4B is shown, in accordance with an embodiment of the disclosure. Example water scale prevention device 20 has a body 21 that may be formed from a plumber's cross fitting with removable plugs 26A, 26B inserted for ease of service and construction, or which may, for example, be a molded assembly forming one contiguous piece, molded around the internal components. Example water scale prevention device 20 has an inlet fitting 22A and an outlet fitting 26B, which are illustrated as threaded pipe fittings, but which alternatively may be slip fittings, flare fittings, push-to-connect fittings, or other types of attachment suitable for a particular type of installation and associated plumbing.

Figure 3A:
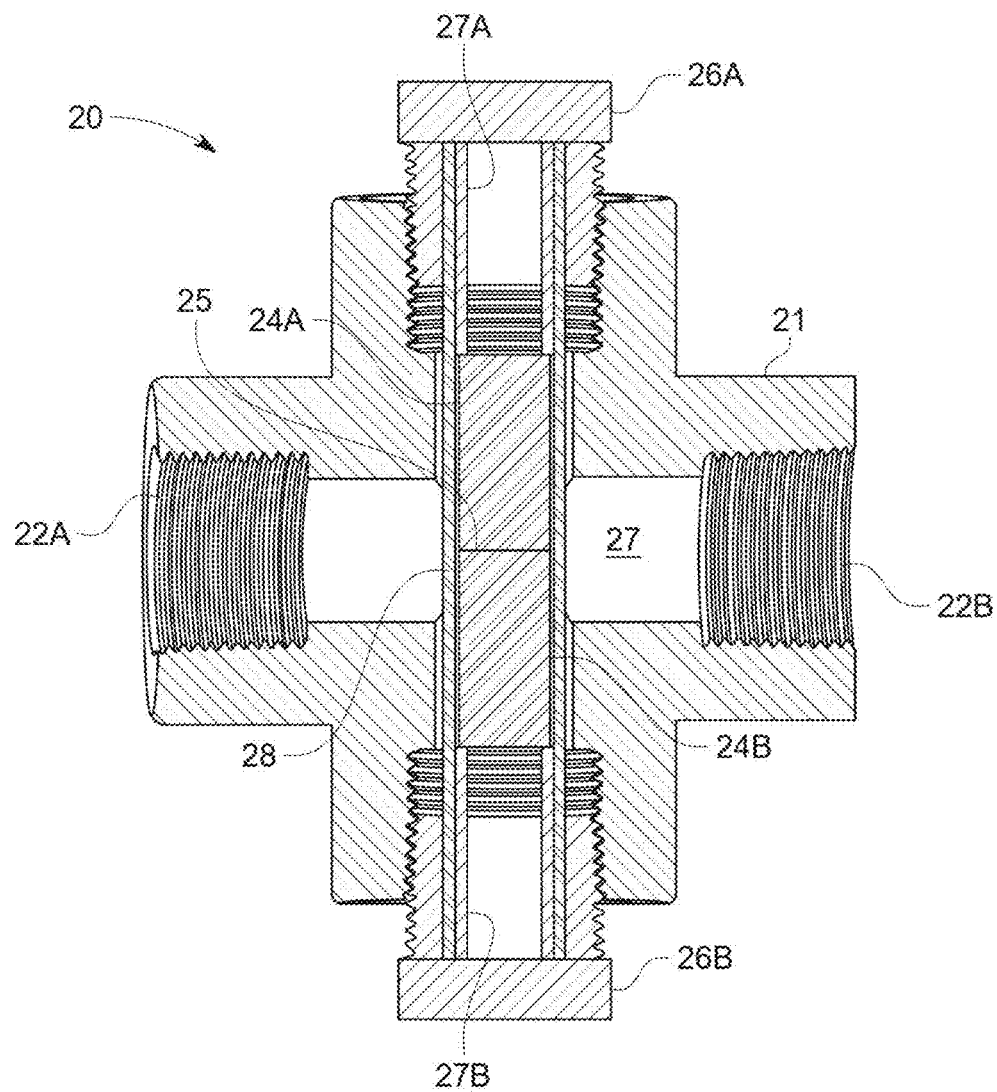
FIG. 3A is a front cross-section view of example water scale prevention device 20, in accordance with an embodiment of the disclosure.

Referring now to FIG. 3A, a front cross-section view of example water scale prevention device 20 is shown, in accordance with an embodiment of the disclosure. Within example water scale prevention device 20, a pair of permanent rod magnets 24A, 24B are arranged with their same magnetic poles in contact, or in very close proximity, at an interface 25 between 24A, 24B, and are retained in such a configuration by force applied by plugs 26A, 26B and spacers 27A, 27B that apply force to corresponding magnets 24A, 24B, by their respective plugs 26A, 26B. For example, the North poles of permanent rod magnets 24A, 24B may be held in contact within example water scale prevention device 20, or alternatively the South poles of permanent rod magnets 24A, 24B may be held in contact within example water scale prevention device 20. Magnets 24A, 24B are examples of suitable magnets that a may be used within example water scale prevention device 20, and will generally be permanent rare-earth magnets in order to provide a very strong magnetic field. While rod magnets having a circular cross-section are employed as magnets 24A, 24B in the exemplary illustration, magnets 24A, 24B may alternatively be bar magnets having a square or rectangular cross-section. Additionally, multiple magnets may be used on either side of interface 25, for example, two or three magnets per side, which may be arranged with their opposite polarity poles in contact to make an effectively longer magnet on either side of interface 25, or with their same-polarity poles opposed as with magnets 24A, 24B, to provide multiple interfaces between same-polarity poles to intensify the magnetic field at the additional interfaces. A protective sleeve 28 is fitted around magnets 24A, 24B, which assists in maintaining the lateral position of magnets 24A, 24B, and protects the magnets 24A, 24B from direct contact with the water flow through a magnetizing chamber 27, as well as protecting the water from any contamination from magnets 24A, 24B. Protective sleeve 28 may be a food-safe plastic, stainless steel, or other tube formed from suitable non-magnetic material.

Figure 3B:
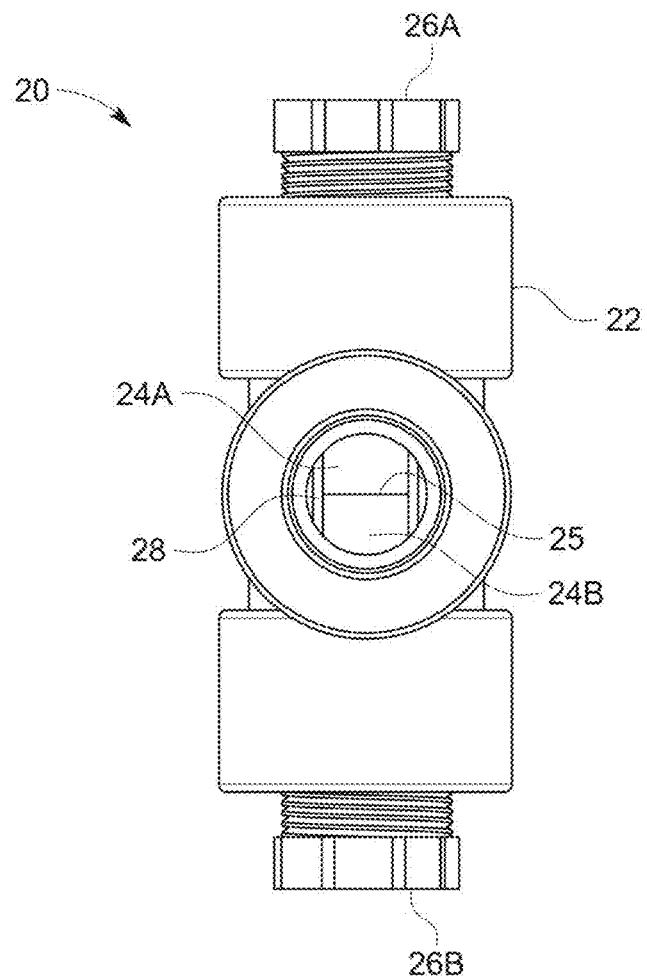
FIG. 3B is a side view of example water scale prevention device 20, in accordance with an embodiment of the disclosure.

Referring now to FIG. 3B, a side view of example water scale prevention device 20 is shown, in accordance with an embodiment of the disclosure. The position of plugs 26A, 26B with respect to magnets 24A, 24B is visible, as well as the position of interface 25 within the water flow.

Figure 3C:
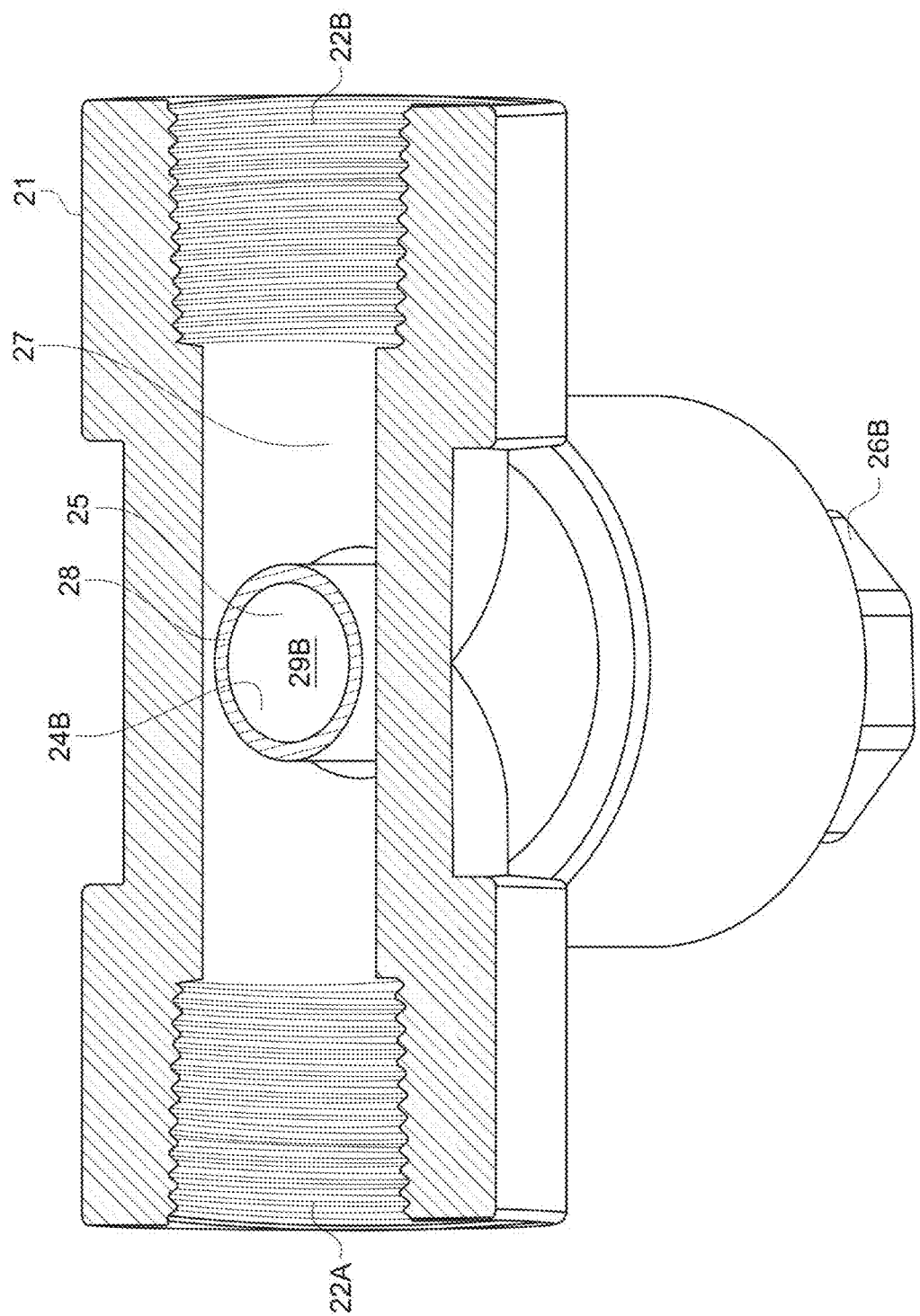
FIG. 3C is a perspective cross-section view of a bottom portion of example water scale prevention device 20, in accordance with an embodiment of the disclosure.

Referring now to FIG. 3C, a perspective cross-section view of a bottom portion of example water scale prevention device 20 is shown, in accordance with an embodiment of the disclosure. An end face 29B of magnet 24B is shown, which is placed in contact or very close proximity to an end face of magnet 24A (not shown), where both ends are, for example, North poles of magnets 24A, 24B.

Figure 3D:
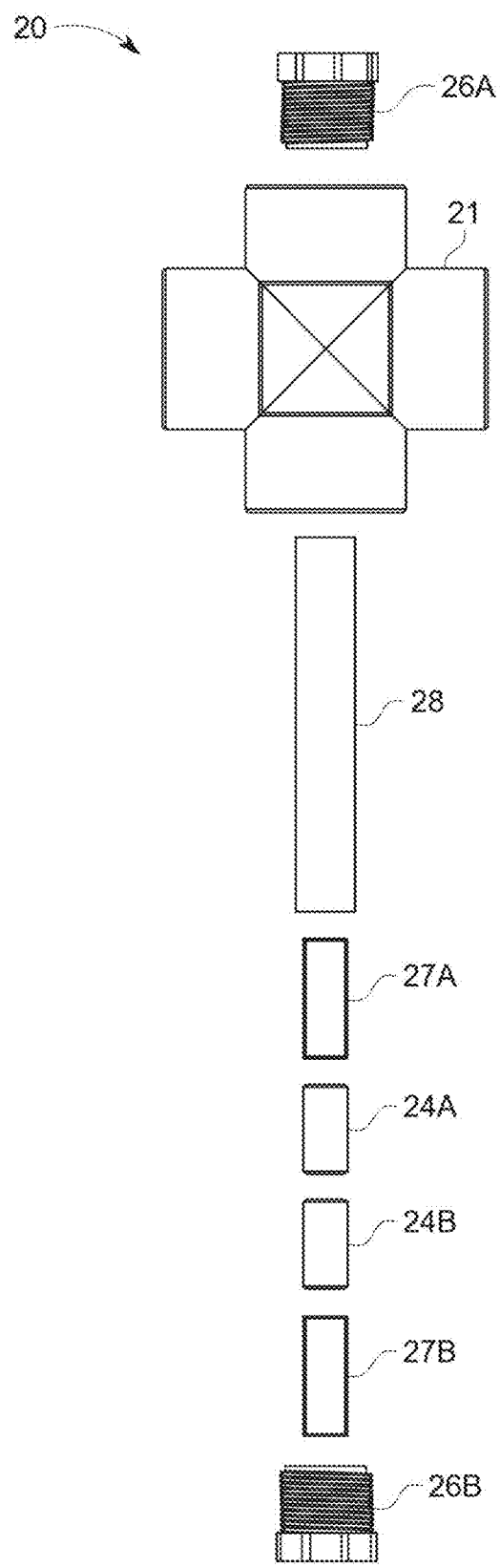
FIG. 3D is an exploded view of example water scale prevention device 20, in accordance with an embodiment of the disclosure.

Referring now to FIG. 3D, an exploded view of example water scale prevention device 20 is shown, in accordance with an embodiment of the disclosure. Protective sleeve 28 is fitted around magnets 24A, 24B and spacers 27A, 27B and are inserted in body 21 through the cylindrical void that passes through body 21 from bottom to top. Plugs 26A, 26B are screwed in to the threaded fittings at the top and bottom of the plumbing cross forming body 21 to complete the assembly of example water scale prevention device 20.

Referring now to FIG. 4A, a block diagram of another example water scale prevention system 10B is shown, in accordance with an embodiment of the disclosure. Water scale prevention system 10B is implemented in the water recirculation path of a dishwasher 40, which receives input water flow from a water source WS, e.g., from a municipal water system, which is coupled to dishwasher 40. Water input is controlled by an input solenoid valve 7A of dishwasher, and may additionally be conditioned as described above with reference to example water scale prevention system 10A of FIGS. 1A-1B. However, example water scale prevention system 10B prevents scale formation within dishwasher 40 and on dishes, glasses, and utensils within dishwasher 40 that may be caused not only by components of water received from water source WS, but by detergents and other additives introduced within dishwasher 40. Water scale prevention device 20 exposes water flow conducted through a recirculation path from a collecting sump 42 that collects water at the bottom of dishwasher 40 that is recirculated by a recirculation pump 44 and provided by a sprayer assembly 46 that sprays water on dishes, glasses, and utensils within dishwasher 40. and prevents or reduces scale formation as described above. Water scale prevention device 20 exposes the recirculating water flow to a strong magnetic field, changing the characteristics of any scale and scale pre-products in the recirculating water and/or changing the process by which scale would otherwise form on, e.g., glassware and other contents of dishwasher 40.

Referring now to FIG. 4B, a pictorial view of example water scale prevention system 10B is shown, in accordance with an embodiment of the disclosure. Water scale prevention device 20 is connected between recirculation pump 44 and sprayer 46 at the bottom of dishwasher 40, which is illustrated as a bottom view of dishwasher 40 in FIG. 4B.

Figure 5:
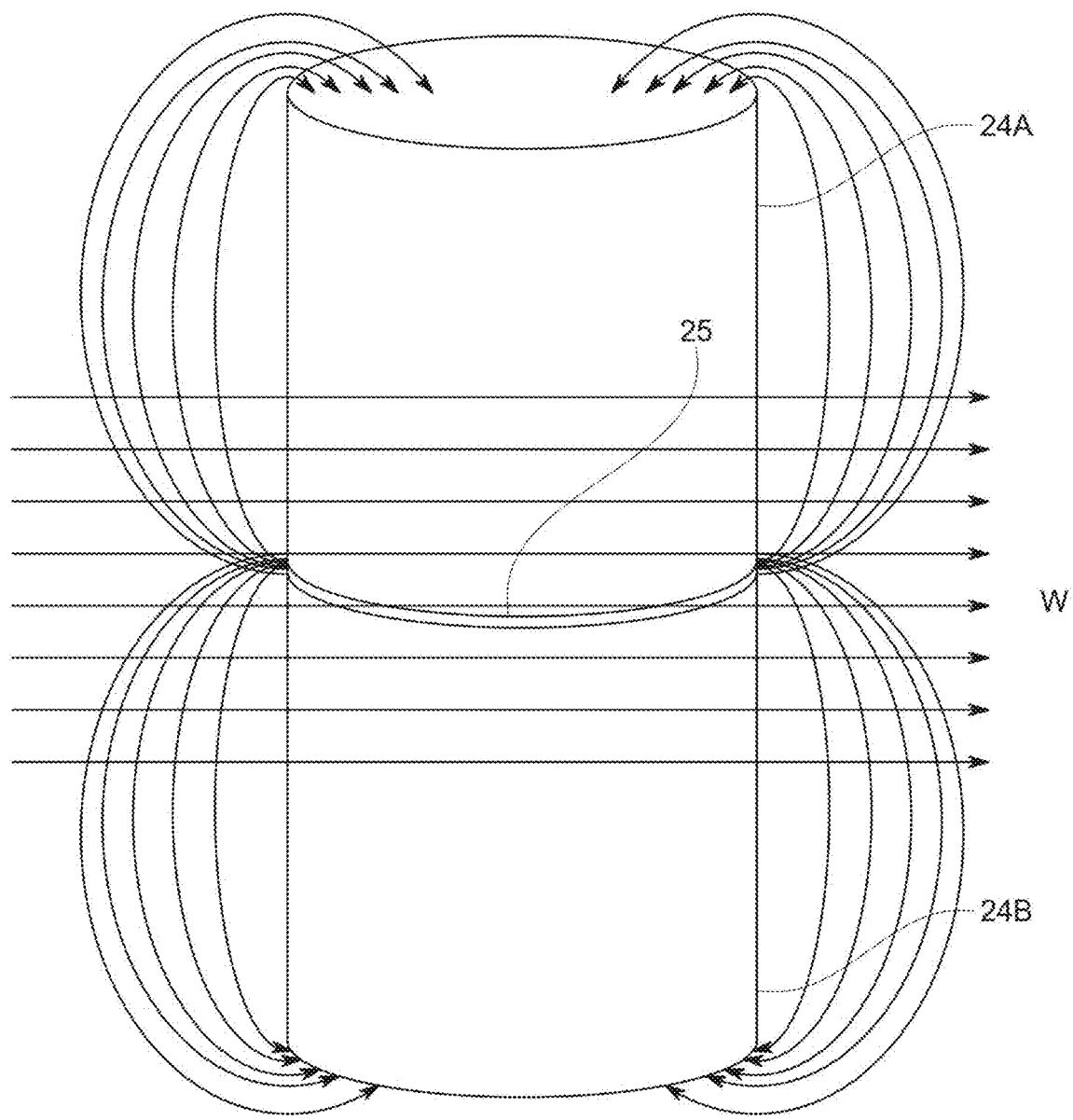
FIG. 5 is a pictorial view of a magnetic field generated by example water scale prevention device 20, in accordance with an embodiment of the disclosure.

Referring now to FIG. 5, a pictorial view of a magnetic field generated by example water scale prevention device 20 is shown, in accordance with an embodiment of the disclosure. The direction of water flow W is illustrated, as are field lines of the strong magnetic field generated at interface 25, where the proximal ends of magnets 24A, 24B are abutted, and, which terminate on the distal ends of magnets 24A, 26B to complete the magnetic loop. The field intensity is enhanced, i.e., at least doubled, in the vicinity of interface 25, since the field lines must terminate on one or the other of the distal ends of magnets 24A, 26B. Additionally, the field passes through the volume of water surrounding interface 25 on all sides of magnets 24A, 26B, due to the central placement of the portion of the cylinders of rod magnets 24A, 26B within water flow W.

Figure 6:
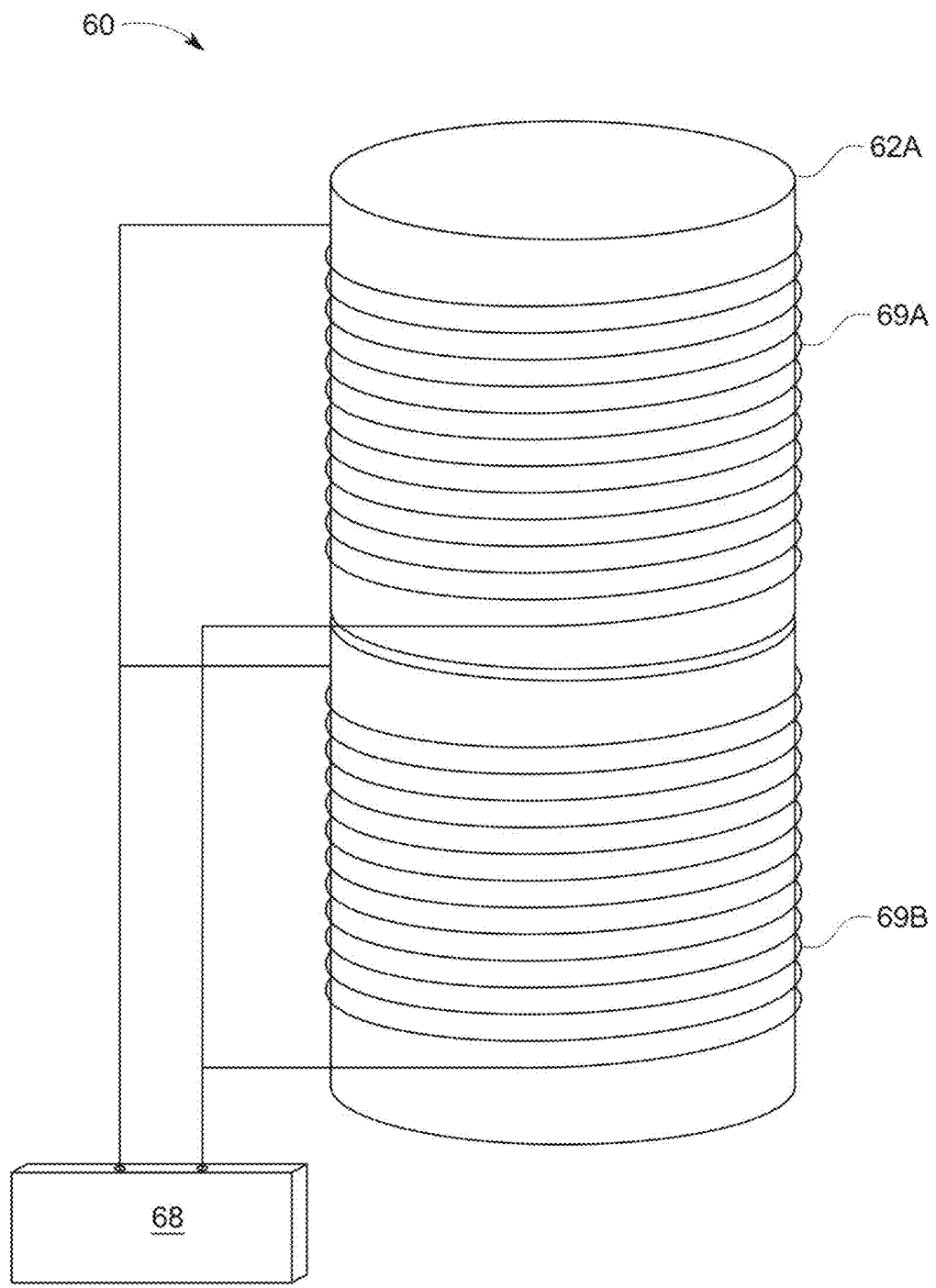
FIG. 6 is a pictorial view of an alternative magnet arrangement 60 that may be used within example water scale prevention device 20, in accordance with an embodiment of the disclosure.

Referring now to FIG. 6, a pictorial view of an alternative magnet arrangement 60 that may be used within example water scale prevention device 20 is shown, in accordance with an embodiment of the disclosure. Instead of using permanent, e.g., rare earth magnets as in the examples of water scale prevention device 20 as described above, a pair of electromagnets formed by a pair of separate windings 64A, 64B wound around a pair of cores 62A, 62B, which may be iron, steel, a ferrous composite, or other suitable formed or machined cores, are connected to a power supply unit (PSU) 66 that supplies current to energize magnet arrangement 60 so that opposite poles are formed at the interface between cores 62A, 62B. PSU 66 may be a DC current supply, but alternatively very low-frequency AC current operation, e.g., periodic pole inversion, is also contemplated, and may be desirable if needed to avoid permanent magnetization of cores 62A, 62B.

In summary, this disclosure shows and describes example water scale prevention systems and devices. This disclosure also shows and describes methods, which are methods of operation of the systems and/or devices. The water scale prevention systems may include the devices, which are devices for applying a magnetic field to a flow of water containing suspended scale. The devices include an inlet for receiving an inlet water flow, a magnetizing chamber, and an outlet for providing an outlet water flow. The magnetizing chamber may include at least one permanent magnet at least partially disposed within the water flow and having an axis extending between the poles of the magnet in a direction perpendicular to the flow, so that the magnetizing chamber exerts a magnetic force on scale suspended within the inlet water flow.

In some example embodiments, the system may include a shut-off valve coupled to the outlet that interrupts the outlet water flow, and the suspended scale may remain in suspension in the outlet water flow when the outlet water flow is interrupted. In some example embodiments, the system may further include a water filter or water softener having an inlet coupled to the inlet of the water processing system and an outlet coupled to the magnetizing chamber. The water filter may include a scale control medium, which may be a polyphosphate scale control medium and/or may include a water softener. In some example embodiments, the at least one permanent magnet may include includes a pair of rod/bar magnets each having a first one of their ends mechanically held in proximity within the magnetizing chamber. The first one of the ends of each of the pair of rod/bar magnets may have the same magnetic polarity, so that an intensity of a magnetic field within the magnetizing chamber is increased.

In some example embodiments, the first ends of the pair of rod/bar magnets may be held in mechanical contact. In some example embodiments an inlet and outlet of the magnetizing chamber may be provided by a first through passage of a plumbing cross, and the pair of rod/bar magnets may be installed in a second through passage of the plumbing cross that is perpendicular to the first through passage. The pair of rod/bar magnets may be secured in the second through passage and passing through the center of the first through passage by plugs installed at each end of the plumbing cross. In some example embodiments, the water processing system may be an automatic dishwasher, and the magnetizing chamber may be disposed within a circulating flow of the automatic dishwasher, and causes scale within the circulating flow to remain in suspension, so that deposits on dishware are reduced.

While the disclosure has shown and described particular embodiments of the techniques disclosed herein, it will be understood by those skilled in the art that the foregoing and other changes in form, and details may be made therein without departing from the spirit and scope of the disclosure. For example, the techniques shown above may be applied to systems other than water treatment systems.

What is claimed is:

1. A water processing system, comprising:
    an inlet for receiving an inlet water flow;
    a magnetizing chamber, including at least one permanent magnet at least partially disposed within the water flow, wherein the at least one permanent magnet comprises a rod/bar magnet having an axis extending between the poles thereof in a direction perpendicular to the flow; and an outlet for providing an outlet water flow, wherein the magnetizing chamber exerts a magnetic force on scale suspended within the inlet water flow, whereby the suspended scale remains in suspension in the outlet water flow, wherein the at least one permanent magnet includes a pair of rod/bar magnets each having a first one of their ends mechanically held in proximity within the magnetizing chamber, wherein the first one of the ends of each of the pair of rod/bar magnets have the same magnetic polarity, whereby an intensity of a magnetic field within the magnetizing chamber is increased, wherein an inlet and outlet of the magnetizing chamber are provided by a first through passage of a plumbing cross, wherein the pair of rod/bar magnets are installed in a second through passage of the plumbing cross that is perpendicular to the first through passage, and wherein the pair of rod/bar magnets are secured in the second through passage and passing through the center of the first through passage by plugs installed at each end of the plumbing cross.

2. The system of claim 1, further comprising a shut-off valve coupled to the outlet that interrupts the outlet water flow, and wherein the suspended scale remains in suspension in the outlet water flow when the outlet water flow is interrupted.

3. The water processing system of claim 1, further comprising a water filter or water softener having an inlet coupled to the inlet of the water processing system and an outlet coupled to the magnetizing chamber.

4. The water processing system of claim 3, wherein the water filter or water softener includes a scale control medium.

5. The water processing system of claim 4, wherein the scale control medium is a polyphosphate scale control medium.

6. The water processing system of claim 1, wherein the first ends of the pair of rod/bar magnets are held in mechanical contact.

7. The water processing system of claim 1, wherein the water processing system is an automatic dishwasher, wherein the magnetizing chamber is disposed within a circulating flow of the automatic dishwasher, and causes scale within the circulating flow to remain in suspension, so that deposits on dishware are reduced.

8. A device for applying a magnetic field to a flow of water containing suspended scale, comprising:
    an inlet for receiving an inlet water flow;
    a magnetizing chamber, including at least one permanent magnet at least partially disposed within the water flow and having an axis extending between the poles thereof in a direction perpendicular to the flow; and
    an outlet for providing an outlet water flow, wherein the magnetizing chamber exerts a magnetic force on scale suspended within the inlet water flow, wherein the magnetizing chamber includes a pair of rod/bar magnets each having a first one of their ends mechanically held in proximity within the magnetizing chamber, wherein the first one of the ends of each of the pair of rod/bar magnets have the same magnetic polarity, whereby an intensity of a magnetic field within the magnetizing chamber is increased, wherein the inlet and the outlet are provided by a first through passage of a plumbing cross, and wherein the pair of rod/bar magnets are installed in a second through passage of the plumbing cross that is perpendicular to the first through passage, and wherein the pair of rod/bar magnets are secured in the second through passage and passing through the center of the first through passage by plugs installed at each end of the plumbing cross.

9. The device of claim 8, wherein the first ends of the pair of rod/bar magnets are held in mechanical contact.

10. A method of preventing precipitation of scale in a water system, the method comprising:
    receiving an inlet water flow;
    exposing the flow to a magnetic field generated by a magnetizing chamber including at least one permanent magnet at least partially disposed within the water flow, wherein the at least one permanent magnet has an axis extending between the poles thereof in a direction perpendicular to the flow;
    providing an outlet water flow from the magnetizing chamber, wherein the magnetizing chamber exerts a magnetic force on scale suspended within the inlet water flow, whereby the suspended scale remains in suspension in the outlet water flow; and
    increasing an intensity of a magnetic field within the magnetizing chamber with a pair of rod/bar magnets each having a first one of their ends mechanically held in proximity within the magnetizing chamber, wherein the first one of the ends of each of the pair of rod/bar magnets have the same magnetic polarity, wherein an inlet and an outlet of the magnetizing chamber are provided by a first through passage of a plumbing cross, wherein the pair of rod/bar magnets are installed in a second through passage of the plumbing cross that is perpendicular to the first through passage, and wherein the pair of rod/bar magnets are secured in the second through passage and passing through the center of the first through passage by plugs installed at each end of the plumbing cross.

11. The method of claim 10, further comprising interrupting the outlet water flow with a shut-off valve, and wherein the suspended scale remains in suspension in the outlet water flow when the outlet water flow is interrupted.

12. The method of claim 10, further comprising filtering or softening the water prior to the exposing the flow to a magnetic field with a water filter or water softener having an inlet that receives the inlet water flow and an outlet coupled to the magnetizing chamber.

13. The method of claim 12, wherein the filtering or water softening comprises exposing the water flow to a scale control medium.

14. The method of claim 13, wherein the scale control medium is a polyphosphate scale control medium.

15. The method of claim 12, further comprising mechanically securing the first ends of the pair of rod/bar magnets in mechanical contact.

16. The method of claim 10, wherein the magnetizing chamber is disposed within a circulating flow of an automatic dishwasher, and causes scale within the circulating flow to remain in suspension, so that deposits on dishware are reduced.

* * * * *